United States Patent
Larsson

(10) Patent No.: US 9,698,891 B2
(45) Date of Patent: Jul. 4, 2017

(54) REDUCED POWER CONSUMPTION IN A WIRELESS COMMUNICATION SYSTEM WHILE PROVIDING ADEQUATE DIRECTIONAL RADIO COVERAGE

(75) Inventor: Peter Larsson, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 880 days.

(21) Appl. No.: 13/695,361

(22) PCT Filed: May 21, 2010

(86) PCT No.: PCT/SE2010/050554
§ 371 (c)(1),
(2), (4) Date: Oct. 30, 2012

(87) PCT Pub. No.: WO2011/145990
PCT Pub. Date: Nov. 24, 2011

(65) Prior Publication Data
US 2013/0050053 A1    Feb. 28, 2013

(51) Int. Cl.
*H04B 7/06* (2006.01)
*H04W 52/02* (2009.01)

(52) U.S. Cl.
CPC ......... *H04B 7/0671* (2013.01); *H04B 7/0689* (2013.01); *H04W 52/0206* (2013.01); *Y02B 60/50* (2013.01)

(58) Field of Classification Search
CPC ................................ H01Q 3/24; H04B 7/0671
USPC ............... 455/101, 562.1; 375/260; 343/876; 342/374
See application file for complete search history.

(56) References Cited

U.S. PATENT DOCUMENTS 5,574,989 A * 11/1996 Watson ................ H04B 7/0671
375/347
6,091,970 A * 7/2000 Dean .......................... 455/562.1
6,842,487 B1 * 1/2005 Larsson ............... H04B 7/0671
375/260

(Continued)

FOREIGN PATENT DOCUMENTS

CN    101622798 A    1/2010
WO    0011806 A1    3/2000

*Primary Examiner* — Dameon E Levi
*Assistant Examiner* — Walter Davis
(74) *Attorney, Agent, or Firm* — Coats and Bennett, PLLC

(57) ABSTRACT

There is provided an arrangement for a wireless communication system that includes a set of power amplifiers and a set of antennas based on which at least two different configurations are provided, including a first configuration of power amplifiers and antennas and a second configuration of power amplifier(s) and antennas. The arrangement also includes switching circuitry configured to switch between the configurations. The second configuration employs a smaller number of power amplifiers than the first configuration, and the second configuration has fewer power amplifiers than antennas where at least one power amplifier is connected to at least two antennas via respective antenna branches that are configured with different delays, as represented by delay elements. A difference in delay between a pair of these antenna branches is based on a measure representative of the inverse bandwidth of a signal to be transmitted through the antennas.

19 Claims, 23 Drawing Sheets

(56) References Cited

U.S. PATENT DOCUMENTS

| | | | |
|---|---|---|---|
| 7,741,997 B1 * | 6/2010 | Jacomb-Hood | H01Q 25/00 |
| | | | 342/374 |
| 7,965,235 B2 * | 6/2011 | Quan et al. | 342/374 |
| 8,509,724 B2 | 8/2013 | D'Amico et al. | |
| 2005/0143024 A1 | 6/2005 | Sung et al. | |

* cited by examiner

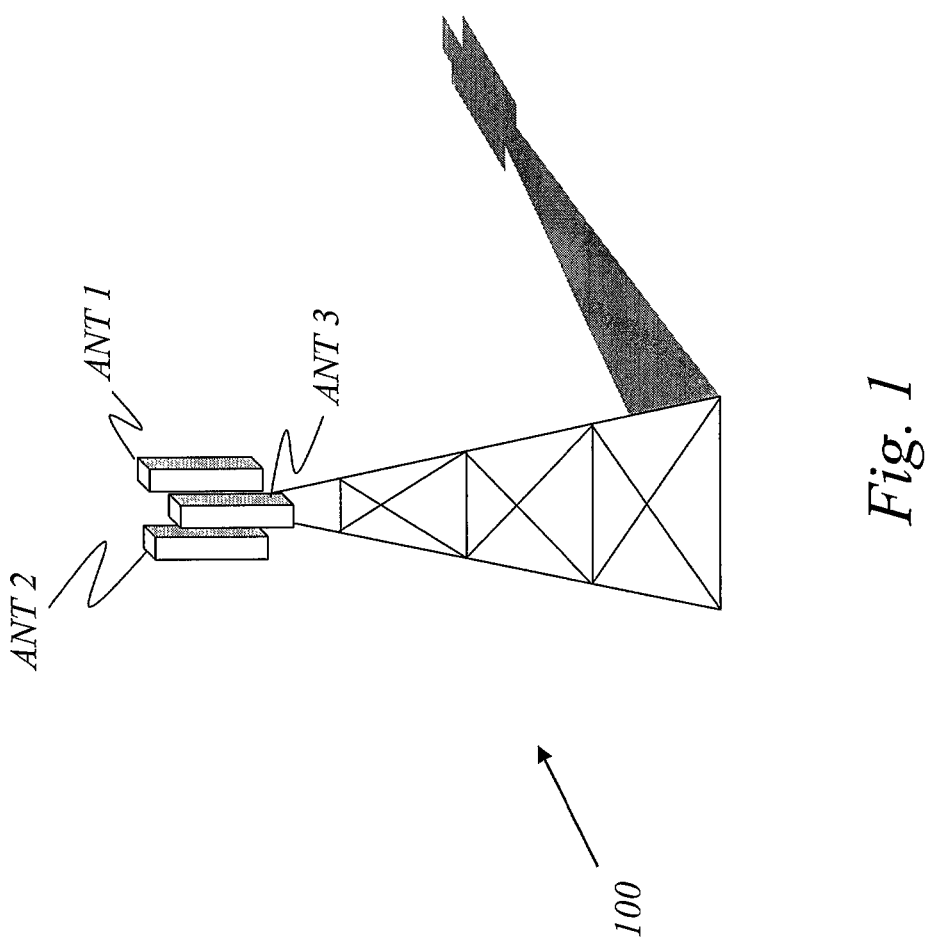

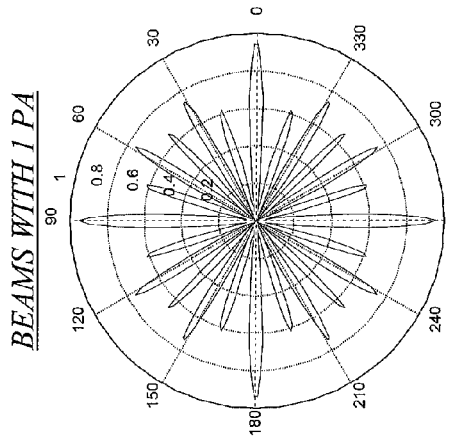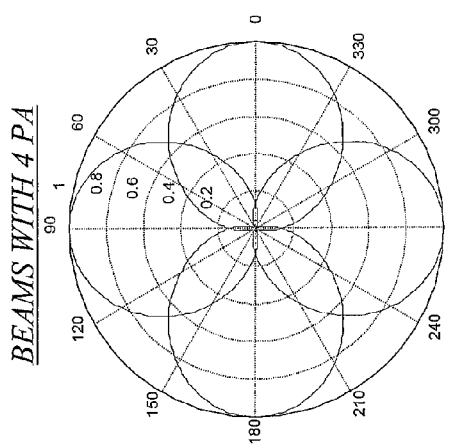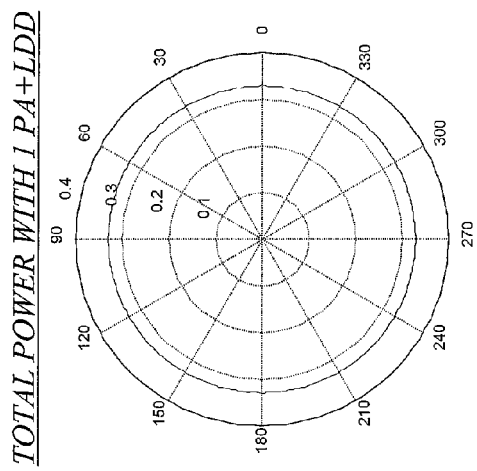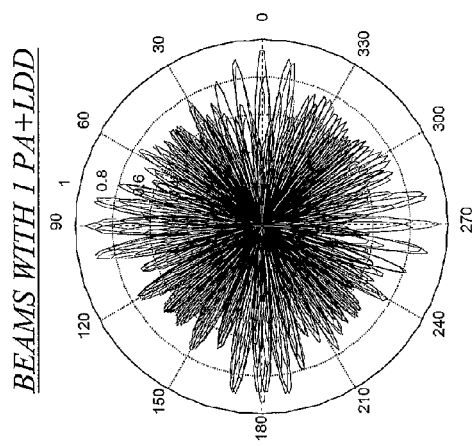
Fig. 12B
Fig. 12A
Fig. 13B
Fig. 13A

REDUCED POWER CONSUMPTION IN A WIRELESS COMMUNICATION SYSTEM WHILE PROVIDING ADEQUATE DIRECTIONAL RADIO COVERAGE

TECHNICAL FIELD

The invention relates to wireless communication systems, and more particularly to an arrangement of power amplifiers and antennas for use in such wireless communication systems.

BACKGROUND

Energy costs can account for as much as half of a mobile operator's operating expenses, so wireless network solutions that improve energy efficiency are not only good for the environment, but also make commercial sense for operators and support sustainable, profitable business.

FIG. 1 is a schematic illustration of an example of a radio base station 100 having a number of antennas ANT1, ANT 2, ANT 3, each of which typically covers a respective sector or cell. As illustrated in FIG. 2A, a number of power amplifiers 10-1, 10-2, 10-3 are used to power the antennas 20-1, 20-2, 20-3. Normally, each antenna has its own power amplifier. For standard directional antennas, each antenna is arranged to have a radiation pattern that covers a respective angular sector, also referred to as a cell, such that all antennas together provide substantially omnidirectional radio coverage, as illustrated in FIG. 2B.

A solution for saving power involves temporarily inactivating cells into passive cells, where the associated radio base stations do not transmit any cell-defining signals for the passive cells, but only for active cells. Such an inactivation of cells not only saves power for the radio base stations but also contributes to lowering the total interference level in the radio communication network. However, the downside of this solution is of course that there is no radio coverage in the inactivated cell(s), and hence there is no support for user traffic within the corresponding geographic area. This type of solution may be thus satisfactory during periods in which there is no need for radio communication services in some of the cells.

It is known that a power amplifier and surrounding electronics consume a relatively high quiescent power, even if the output power is zero, as illustrated in FIG. 3.

It therefore makes sense to use fewer power amplifiers as the total power consumption can be reduced. A possible approach is to connect only a subset of the power amplifiers, e.g. a single power amplifier, to the existing antennas, as illustrated in FIG. 4. Unfortunately, the resulting combined radiation pattern of all the antennas will have a lot of deep nulls, i.e. very low radiated power in certain directions, so-called null-depths, as illustrated in FIGS. 5A-B. This means that this approach provides inadequate directional coverage.

It is thus desirable to reduce power consumption while ensuring adequate directional radio coverage—two seemingly conflicting requirements.

Reference [1] discloses a base station comprising an arrangement of several directional antennas, whose individual azimuthal beam patterns achieve a substantially omnidirectional coverage. The signal from a base station transceiver is split into three signals, each which is amplified and fed to a respective one of the directional antennas to provide a "pseudo-omnidirectional" pattern. The main drawback with this solution is that a number of sharp null-depths are created in the "pseudo-omnidirectional" pattern, which will cause areas of poor or no coverage. Phase shifters may be used to shift the phase of the transmitted signals in order to reduce the effect of null-depths resulting from the connection of the transceiver to more than one antenna at a time. The phase shifters may thus move the null-depths, but will generally not be able to eliminate them.

Reference [2] describes how a base station is allowed to simultaneously transmit signals in several beams of a multi-beam antenna configuration, where antenna pattern control is maintained by employing orthogonal polarization orientation for every other beam.

Reference [3] relates to an antenna arrangement configured to provide an omnidirectional radiation pattern substantially without null-depths when the radiation pattern of a number of partially overlapping beams are combined under certain conditions, including the use of different orthogonal polarizations for antennas/antenna clusters covering neighboring angular sectors.

SUMMARY

It is a general object to reduce power consumption in wireless communication systems while providing adequate directional radio coverage.

It is a specific object to provide an arrangement for a wireless communication system.

Another object is to provide a radio base station comprising such an arrangement.

It is another specific object to provide a method for configuring an arrangement having a set of power amplifiers and a set of antennas.

These and other objects are met by embodiments as defined by the accompanying patent claims.

According to a first aspect, there is provided an arrangement for a wireless communication system. The arrangement includes a set of power amplifiers and a set of antennas based on which at least two different configurations are provided, including a first configuration of power amplifiers and antennas and a second configuration of power amplifier(s) and antennas. The arrangement also includes switching circuitry configured to switch between the configurations. The second configuration employs a smaller number of power amplifiers than the first configuration, and the second configuration has fewer power amplifiers than antennas where at least one power amplifier is connected to at least two antennas via respective antenna branches that are configured with different delays. A difference in delay between a pair of these antenna branches is based on a measure representative of the inverse bandwidth of a signal to be transmitted through the antennas.

In this way it is possible to switch between the different power amplifier-antenna configurations, where the second configuration employs fewer power amplifiers than antennas for power consumption reduction purposes. By configuring antenna branches of the second configuration with different delays, wherein a difference in delay between a pair of antenna branches is based on a measure representative of the inverse bandwidth, adequate directional radio coverage can be ensured even though a configuration comprising fewer power amplifiers than antennas is employed.

There is also provided a radio base station comprising such an arrangement.

According to a second aspect there is provided a method for configuring an arrangement having a set of power amplifiers and a set of antennas. The method involves providing at least two different configurations of power amplifier(s) and antennas that can alternately be used for transmitting signals, including a first configuration of power amplifiers and antennas and a second configuration of power amplifier(s) and antennas. The second configuration employs a smaller number of power amplifiers than the first configuration, and the second configuration has fewer power amplifiers than antennas where at least one power amplifier is connected to at least two antennas via respective antenna branches. The method further involves configuring the antenna branches with different delays, wherein a difference in delay between a pair of antenna branches is based on a measure representative of the inverse bandwidth of a signal to be transmitted through the antennas.

Other advantages offered by the invention will be appreciated when reading the below description of embodiments of the invention.

BRIEF DESCRIPTION OF THE DRAWINGS

The invention, together with further objects and advantages thereof, may best be understood by making reference to the following description taken together with the accompanying drawings, in which:

FIG. 1 is a schematic illustration of an example of a radio base station having a number of antennas.

FIGS. 12A-B are schematic radiation pattern diagrams illustrating an example of the radiation patterns when four power amplifiers are used in FIG. 12A and the radiation patterns when a single power amplifier is used for all antennas without any mutual delays between the antenna branches in FIG. 12B.

FIGS. 13A-B are schematic radiation pattern diagrams illustrating an example of the individual radiation patterns per sub-carrier in FIG. 13A and the total power over all sub-carriers in FIG. 13B when the antenna branches are configured with different delays according to the example of FIG. 11.

DETAILED DESCRIPTION

Throughout the drawings, the same reference numbers are used for similar or corresponding elements.

Figure 2B:
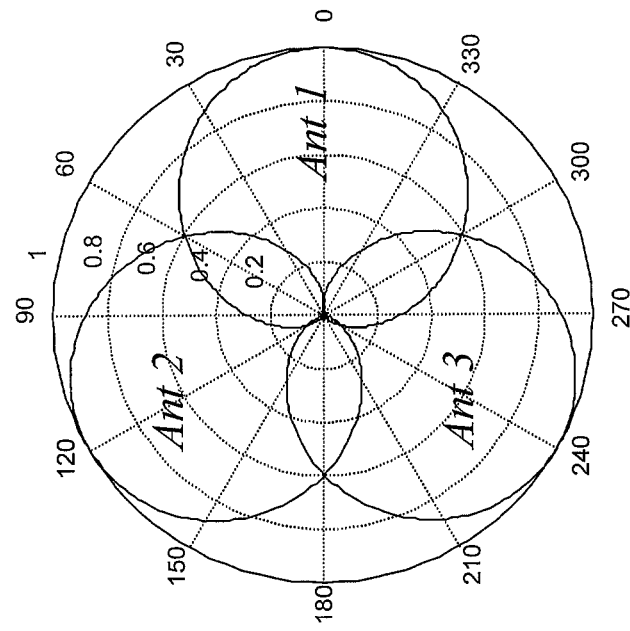
FIG. 2B is a radiation pattern diagram illustrating that each antenna has a radiation pattern that covers a respective angular sector (cell) and that all antennas together provide substantially omnidirectional radio coverage.
Figure 2A:
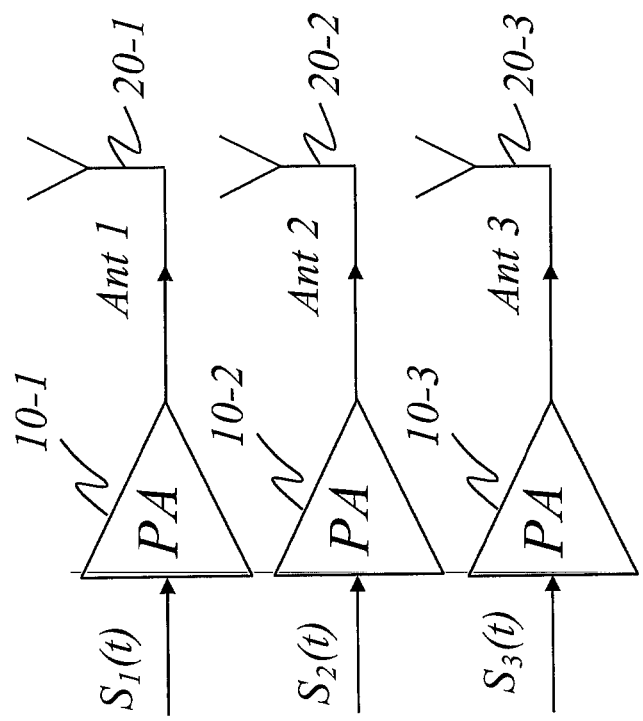
FIG. 2A is a schematic diagram illustrating a conventional antenna arrangement where each antenna has a designated power amplifier.
Figure 3:
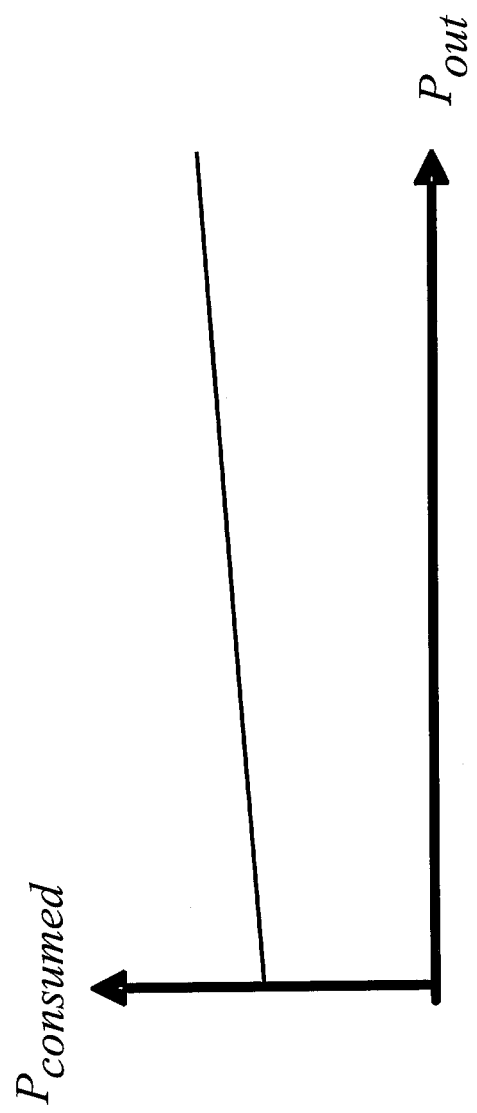
FIG. 3 is a schematic diagram illustrating the relation between consumed power of a power amplifier versus output power.

As previously mentioned, existing power amplifier-antenna designs consume a large amount of so-called quiescent power (see FIG. 3). It therefore makes sense to use fewer power amplifiers as the total power consumption can be reduced, at least during periods with reduced traffic load such as during the night.

Figure 4:
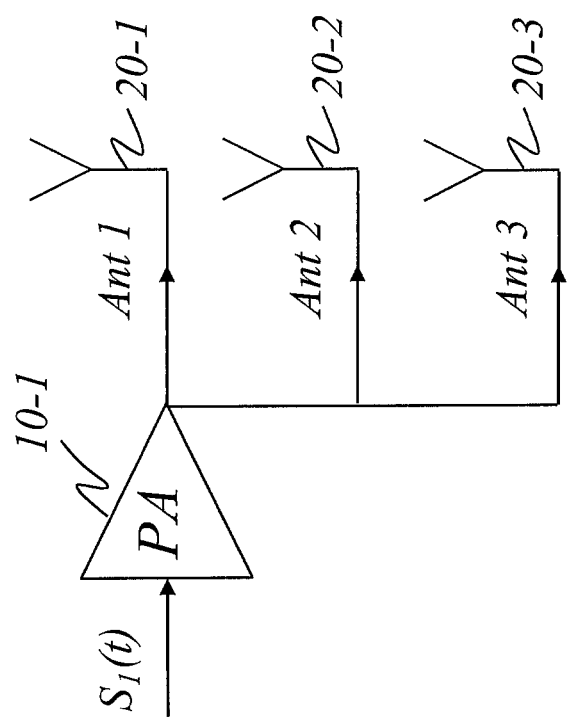
FIG. 4 is a schematic diagram illustrating an example where a single power amplifier is connected to several antennas.
Figure 5B:
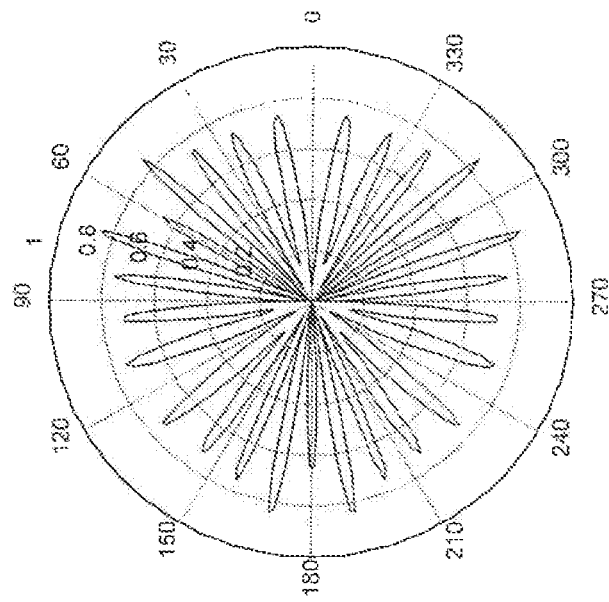
FIGS. 5A-B are schematic radiation pattern diagrams illustrating two examples of the combined radiation pattern of all the antennas corresponding to the arrangement of FIG. 4.
Figure 5A:
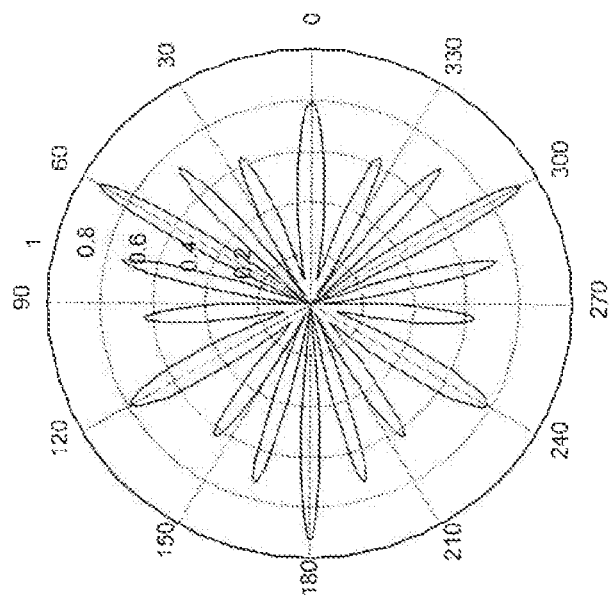

It may be useful to briefly review the approach of connecting only a subset of the power amplifiers, e.g. a single power amplifier, to the existing antennas, as illustrated in FIG. 4. As mentioned, the resulting combined radiation pattern of all the antennas will unfortunately have a lot of so-called null-depths, as illustrated in radiation power diagrams of FIGS. 5A-B.

Figure 6:
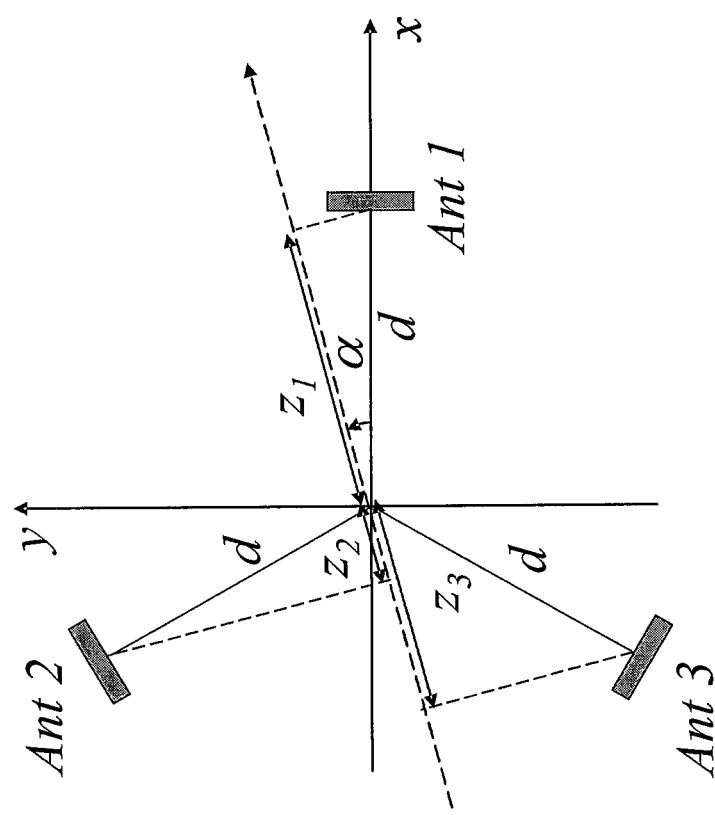
FIG. 6 illustrates an example of an underlying antenna array model.

FIG. 6 illustrates an example of an underlying antenna array model that is assumed when computing the resulting radiation patterns. In the antenna array model, d is the distance to the antennas from a common origin, $z_1=d\cdot\cos(\theta_1)$, $\theta_1=a$, $z_2=d\cdot\cos(\theta_2)$, $\theta_2=a+\pi/3$, $z_3=d\cdot\cos(\theta_3)$, $\theta_3=a-\pi/3$.

Figure 7:
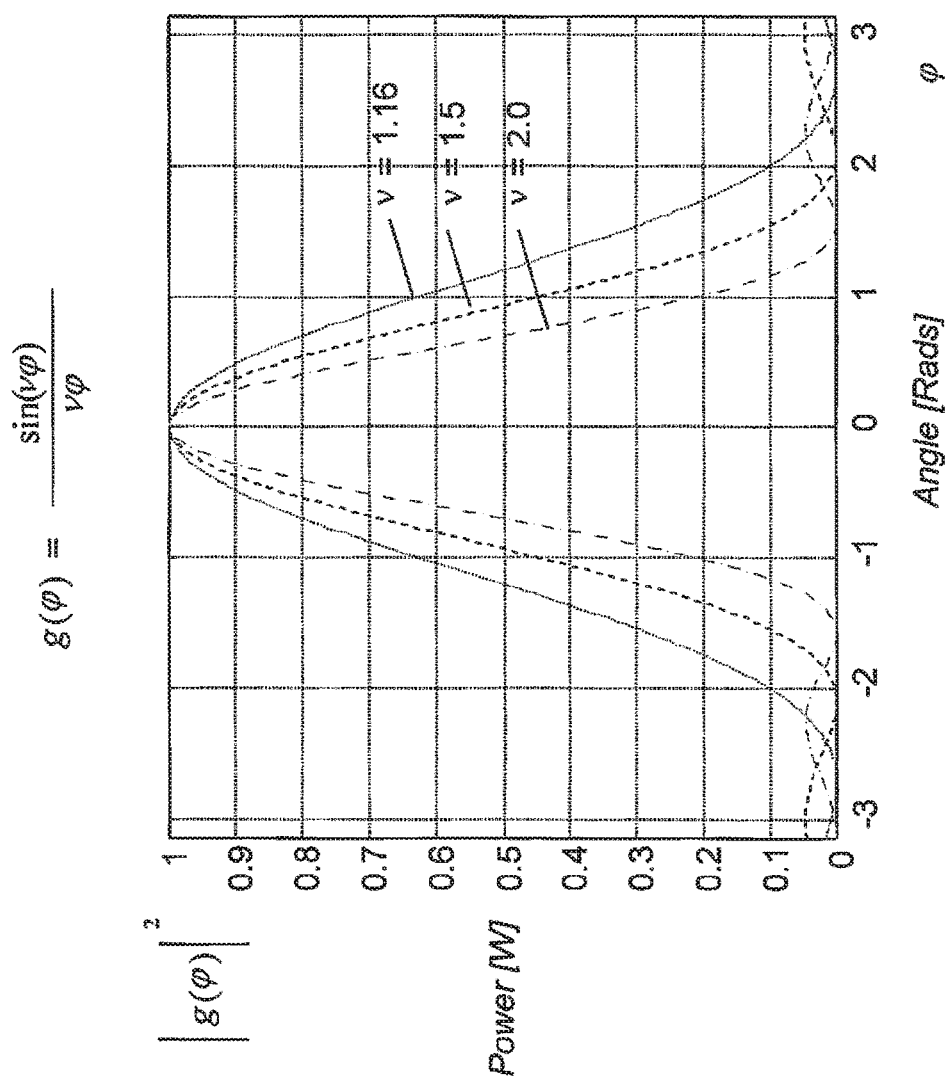
FIG. 7 illustrates an example of a beam pattern model.

FIG. 7 illustrates an example of a simple beam pattern model used when computing the resulting radiation patterns for different values of v, which is a parameter for the model describing the beampattern for the individual antennas.

Referring back to FIGS. 5A-B, the radiation pattern of FIG. 5A is computed under the assumption that $d/\lambda=2$, $v=1.16$, and the radiation pattern of FIG. 5B is computed under the assumption that $d/\lambda=3$, $v=1.16$, where $\lambda$ is the wavelength. As evident from FIGS. 5A-B, the power amplifier-antenna arrangement of FIG. 4 radiates varying amount of power in different directions, and apparently provides inadequate directional radio coverage.

A basic idea is to switch between at least two different configurations of power amplifier(s) and antennas, where one configuration employs a smaller number of power amplifiers than the other configuration(s) and has fewer power amplifiers than antennas for lowered power consumption. The configuration adapted for lowered power consumption has at least one power amplifier connected to at least two antennas via respective antenna branches that are configured with different delays, wherein a difference in delay between a pair of these antenna branches is based on a measure representative of the inverse bandwidth of a signal to be transmitted through the antennas.

Figure 8:
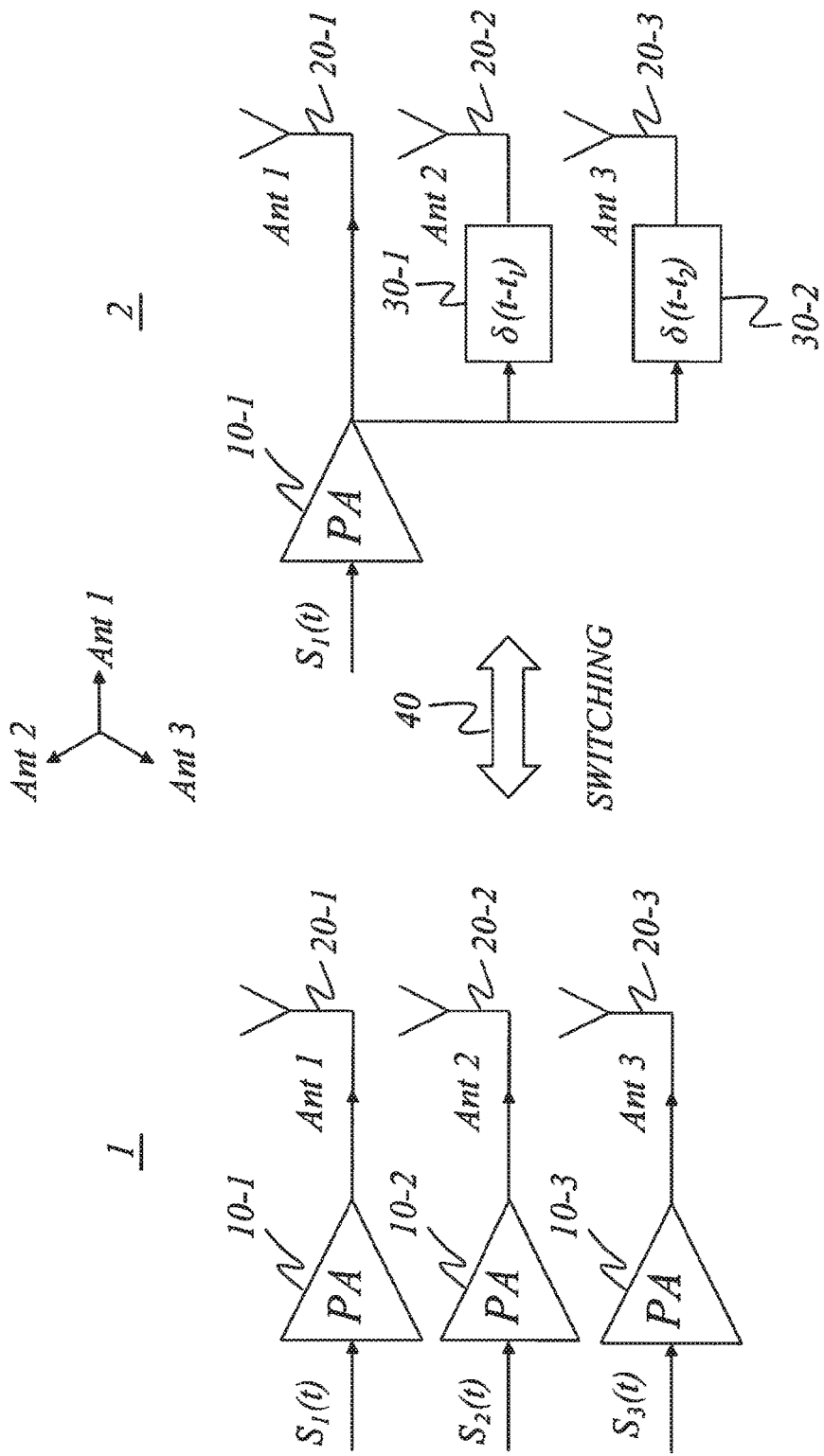
FIG. 8 is a schematic diagram illustrating an example of two different power amplifier-antenna configurations and the possibility of switching between these configurations.

FIG. 8 is a schematic diagram illustrating an example of two different power amplifier-antenna configurations and the possibility of switching between these configurations. A first configuration 1 (left) includes a set of power amplifiers, here exemplified by three amplifiers 10-1, 10-2, 10-3, and a set of antennas, here exemplified by three antennas 20-1, 20-2, 20-3. A second configuration 2 (right) includes a smaller number of power amplifiers than the first configuration, and the second configuration also has fewer power amplifiers than antennas. In this example, there is a single power amplifier 10-1 connected to the same number of antennas as in the first configuration. The power amplifier 10-1 is connected to the antennas 20-1, 20-2, 20-3 via respective antenna branches that are configured with different delays. In this example, the difference in delay is represented by the delay elements 30-1 and 30-2.

In this way it is possible to switch between the different power amplifier-antenna configurations, where the second configuration employs fewer power amplifiers than antennas for power reduction purposes. The switching between the different configurations is effectuated by switching means 40, and may for example be performed in dependence on time and/or traffic load. For example, the first configuration (left) may be used when the traffic load is higher, e.g. during day-time, and the second configuration (right) may be used when the traffic load is lower, e.g. during night-time.

For example, this gives the possibility to adapt energy/power consumption to varying traffic load (e.g. between night and day) while exploiting the same antenna deployment and retaining a combined overall radiation pattern that mitigate direction nulls.

Naturally, the communication range is reduced when a smaller number of power amplifiers is/are used. This can be handled, e.g. by adapting the modulation and coding to a lower rate, and/or using multiple multi-carrier symbols (a.k.a. repetition coding) and/or using a suitable retransmission scheme such as Hybrid Automatic Repeat Request (HARQ). In the latter case, the received energy is accumulated over multiple transmissions.

By configuring antenna branches of the second configuration with different delays, and adapting the difference in delay between a pair of antenna branches based on a measure representative of the inverse bandwidth, adequate directional radio coverage can be ensured even though a configuration comprising fewer power amplifiers than antennas is employed, as will be explained below.

Preferably, when a power amplifier of the second configuration is connected to multiple antennas via respective antenna branches, the differences in delay between different pairs of antenna branches correspond to different non-zero integer multiples of the inverse bandwidth, for example according to: delay $\delta(t-t_k)$, where $t_k=k/BW$ and k is a non-zero integer (1, 2, ... ) and BW is the signal bandwidth. With reference to the example of FIG. 8, a preferred delay configuration would thus be to set $t_1=1/BW$ and $t_2=2/BW$. The antenna branch of antenna 20-1 (Ant 1) may be regarded as a reference branch, which preferably has as small delay as possible. In theory, such a reference branch may have a nominal zero delay, but in practice a zero delay is not attainable.

In a particular example, when a power amplifier is connected to a number N of antennas via respective antenna branches that are configured with different delays, a difference in delay between antenna branch of antenna n and antenna branch of antenna n+1 preferably corresponds to the inverse bandwidth, where n=1, ..., N−1.

It is possible to use a "serial" or "parallel" representation of the delays. In the example of FIG. 8 the delays are represented "in parallel", but as will be illustrated later on it is equally feasible to represent the delays in series as successive delay steps. These two representations of the delays are equivalent.

Preferably, the antennas are directional antennas, as schematically indicated in FIG. 8. Each directional antenna is arranged to have a radiation pattern (including an azimuthal radiation pattern), and each radiation pattern typically covers a respective angular sector such that a combined radiation pattern of all antennas provides larger radio coverage than the radiation pattern of an individual antenna. The antenna radiation patterns may be partially overlapping.

The effect of the delays is that the beam pattern becomes frequency dependent, and with correctly adapted delays the radiation pattern becomes nearly direction-invariant, thus providing adequate directional radio coverage. Preferably, small delays of different integers of the inverse bandwidth are used. The reason for this is that the frequency (and hence sub-carrier) dependent exponential phase factor which the signal for the different antenna branches is multiplied with will be orthogonal to each other, and cover exactly multiple turns of $2\pi$ phase shifts which is needed to shift the beams uniformly over different directions.

In regions between sector coverage patterns, there will be effective channel impulse response that is dominated by only two signals, where one is delayed relative the other. The delay is generally easily absorbed in the cyclic prefix (CP) of a multi-carrier based transmission scheme such as Orthogonal Frequency Division Multiplexing (OFDM).

Figure 9B:
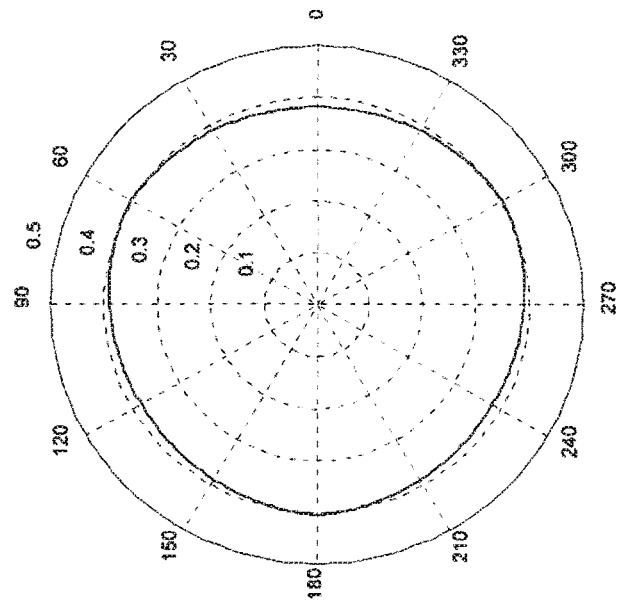
FIGS. 9A-B are schematic radiation pattern diagrams illustrating an example of the individual radiation patterns per sub-carrier in FIG. 9A and the total power over all sub-carriers in FIG. 9B, corresponding to the low power configuration of FIG. 8.
Figure 9A:
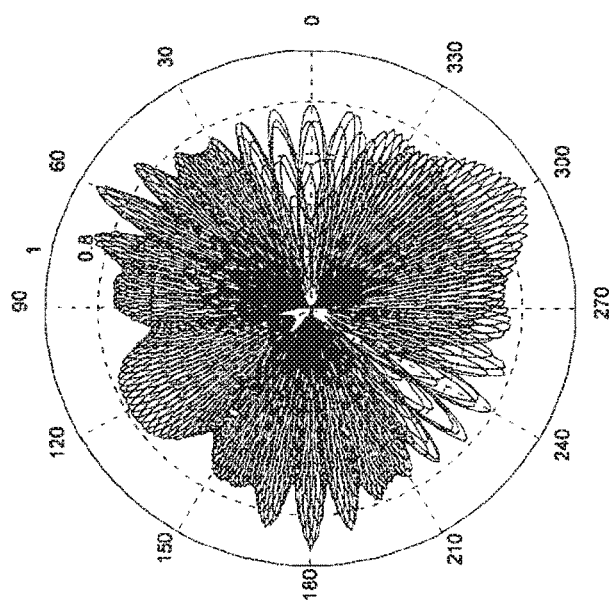

For example, with OFDM and using 1/BW and 2/BW delays, the total received power over all sub-carriers becomes nearly direction-invariant, as illustrated in FIGS. 9A-B.

FIG. 9A illustrates an example of the individual radiation patterns per sub-carrier, and FIG. 9B illustrates the total power over all sub-carriers. In this example, the following configurations are used: $d/\lambda=2$, $v=1.16$, $t_1=1/BW$ and $t_2=2/BW$.

In a particular example, the delays of the antenna branches are adapted to provide a combined radiation pattern substantially without null-depths. Preferably, the combined radiation pattern is an "omnidirectional" radiation pattern.

Linear delay diversity (LDD) [4] is used in fading channels with overlapping beams to induce frequency selectivity in the channel, but here the delays are, in contrast, used for Line of Sight (LoS) signals to induce a frequency dependent azimuth shift in the beam-pattern. Note that the related but more popular idea of cyclic delay diversity (CDD) [5] and [6] for cyclic prefix based communication schemes is not applicable here as CDD needs to be performed in the baseband and therefore requires multiple power amplifiers.

It should be understood that the difference in delay between a pair of antenna branches is based on a measure representative of the inverse bandwidth of a signal to be transmitted through the antennas. Optimal performance is achieved when the difference in delay between a pair of antenna branches equals the inverse bandwidth, but some deviation from the exact inverse bandwidth will normally be acceptable, depending on the performance requirements for a given radio base station.

Simulations and experiments indicate that reasonably high performance can be maintained as long as the difference in delay between a pair of antenna branches is equal to the inverse bandwidth with a 25% margin of precision. Preferably, however, the difference in delay between a pair of antenna branches is equal to the inverse bandwidth with a 10% margin of precision or even better when the delay difference is equal to the inverse bandwidth with a 5% margin of precision.

Another way of expressing the requirements on the delay configuration would be to specify that the delays of the antenna branches in the second configuration are adapted to maintain the max-to-min ratio of radiated power of the combined radiation pattern below a predetermined level. In this context, it is desirable to at least keep the max-to-min ratio of radiated power of the combined radiation pattern below 10 dB. Preferably, however, the max-to-min ratio of radiated power of the combined radiation pattern should be maintained below 6 dB, or even better below 3 dB.

Figure 10:
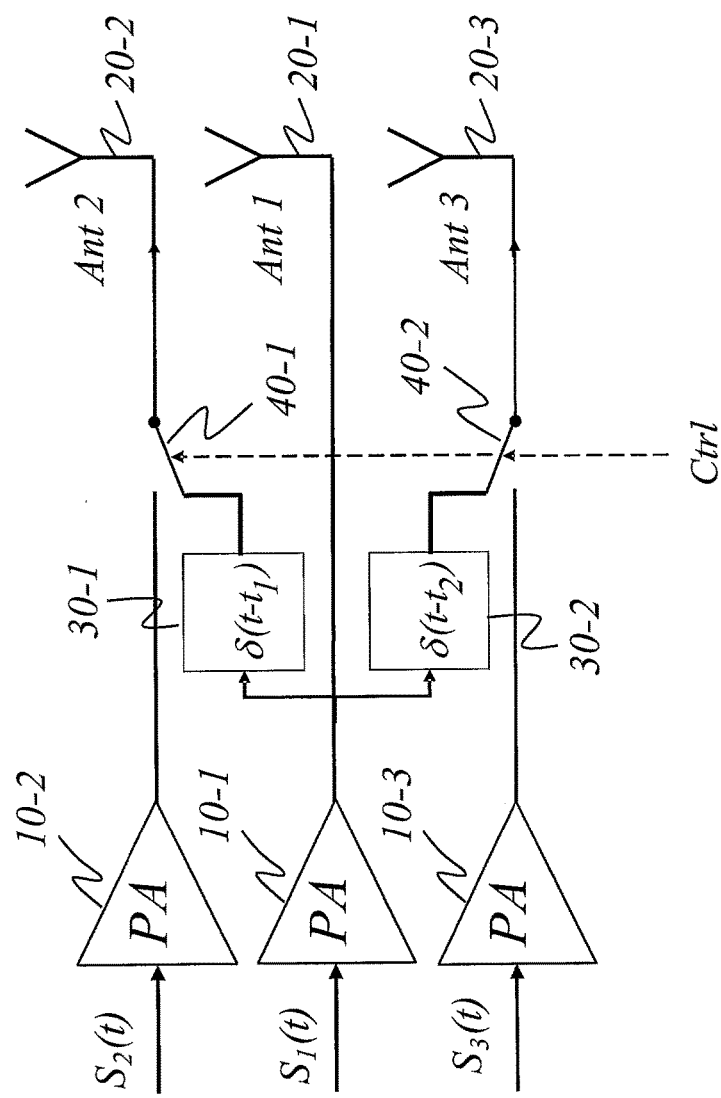
FIG. 10 is a schematic block diagram illustrating an arrangement that includes a set of power amplifiers and a set of antennas based on which at least two different configurations are provided.

FIG. 10 is a schematic block diagram illustrating an arrangement that includes a set of power amplifiers 10-1, 10-2, 10-3 and a set of antennas 20-1, 20-2, 20-3 based on which at least two different configurations are provided, including a first configuration of power amplifiers and antennas and a second configuration of power amplifier(s) and antennas, and switching circuitry 40-1, 40-2 configured to switch between the configurations. The power amplifiers and antennas of the different configurations are preferably taken from the same set, re-using the existing power amplifiers and antennas in a radio base station or similar transceiver station.

FIG. 10 illustrates an example of a circuit design that enables switching between two different configurations of power amplifier(s) and antennas, corresponding to the configurations of FIG. 8.

The delay elements 30-1 and 30-2 are preferably delay lines based on suitable lengths of coaxial cable, but it should be understood that any suitable delay element may be used. In practice this means that the antenna branches have coaxial cables of different lengths to implement the difference(s) in delay. For example, for coaxial cables with a signal speed of ⅔ of the speed of light and a 20 MHz OFDM signal, the additional lengths of coaxial cable needed to provide the desired delays of the delay elements 30-1 and 30-2 would be approximately 10 m and 20 m, respectively.

The switching circuitry 40-1, 40-2 can be realized, for example with Radio Frequency (RF) relays or PIN diodes. The RF relay may be a good option here as it provides low insertion loss, linearity at high power, and does not need to be switched on/off often or extremely fast.

From an RF design point of view, it may also be preferable to have switches on the input to the delay lines 30-1, 30-2 to avoid reflections and impedance matching issues.

The Control (Ctrl) signal(s) moves the switches 40-1, 40-2 to activate the desired configuration of power amplifier(s) and antennas. The arrangement hence operates in response to suitable switch control signals. The instance of changing the configurations may for example be determined in a control program for execution by a suitable processor, e.g. based on measured traffic load or timer based.

The proposed arrangement may be implemented as part of a radio base station similar to e.g. the base station 100 of FIG. 1.

Of course, the idea is not limited to switching between a 3 PA-3 Antenna configuration and a 1 PA-3 Antenna configuration. Any number of power amplifiers and antennas may be used as long as one of the configurations employs a smaller number of power amplifiers than the other configuration(s) and has fewer power amplifiers than antennas.

Figure 11:
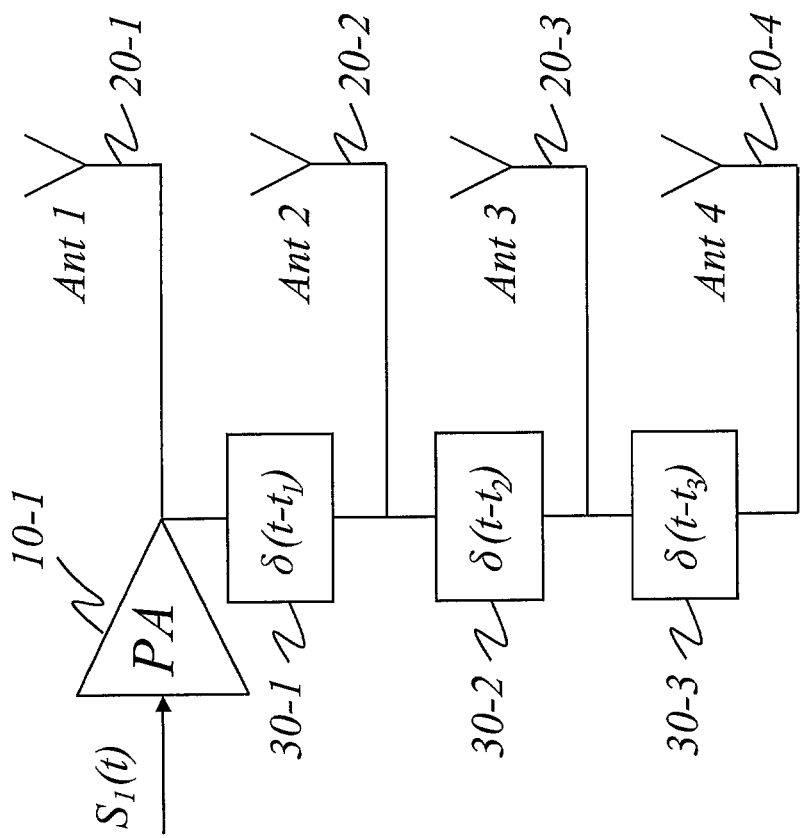
FIG. 11 is a schematic diagram illustrating an example of a low power configuration of a power amplifier and multiple antennas.

FIG. 11 is a schematic diagram illustrating an example of a low power 1 PA-4 Antenna configuration of an original 4 PA-4 Antenna set. In this particular configuration example, a single power amplifier 10-1 is connected to four antennas 20-1, 20-2, 20-3, 20-4 via respective antenna branches that are configured with different delays by using delay elements 30-1, 30-2, 30-3.

In the example of FIG. 11, the delay elements are illustrated as successive delay steps, which successively add extra delay in relation to the reference branch of the first antenna 20-1.

FIGS. 12A-B are schematic radiation pattern diagrams illustrating an example of the radiation patterns when four power amplifiers are used in FIG. 12A and the radiation patterns when a single power amplifier is used for all antennas without any mutual delays between the antenna branches in FIG. 12B.

FIGS. 13A-B are schematic radiation pattern diagrams illustrating an example of the individual radiation patterns per sub-carrier in FIG. 13A and the total power over all sub-carriers in FIG. 13B when the antenna branches are configured with different delays according to the example of FIG. 11. In this example, the following configurations are used: $d/\lambda=3$, $v=1.4$, $t_1=t_2=t_3=1/BW$. It should be clarified that in the example of FIG. 11, the delays are illustrated in series as successive delay steps, which means that the extra delay to the second antenna 20-2 is $1/BW$, the accumulated extra delay to the third antenna 20-3 is $1/BW+1/BW=2/BW$, and the accumulated extra delay to the fourth antenna 20-4 is $1/BW+1/BW+1/BW=3/BW$.

Figure 14:
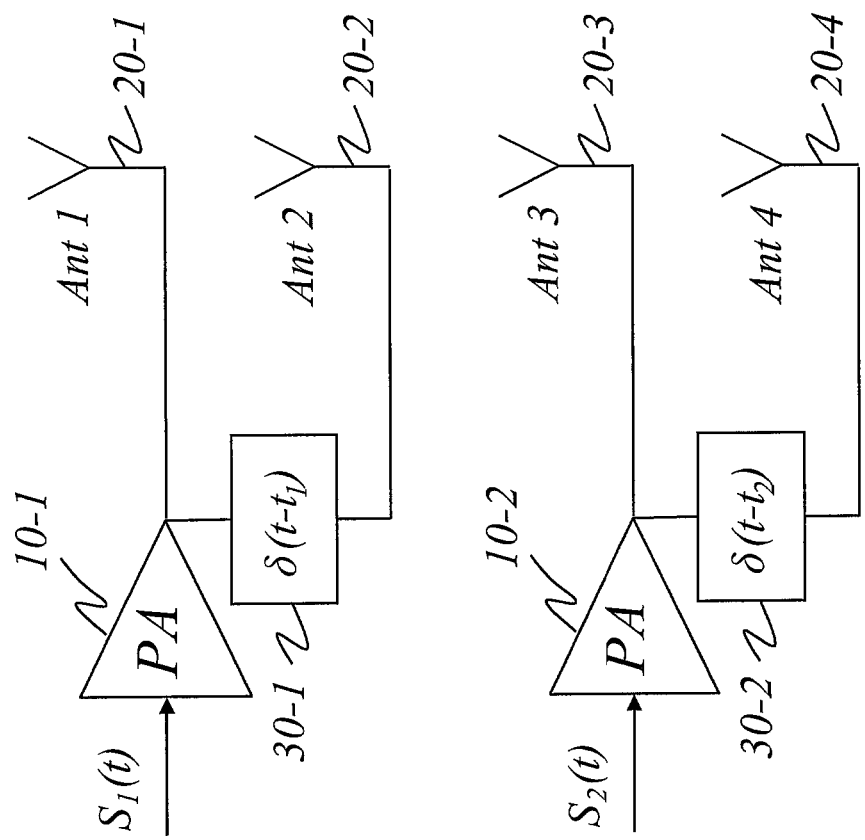
FIG. 14 is a schematic diagram illustrating an example of a low power configuration using two power amplifiers and four antennas, a so-called 2 PA-4 Antenna configuration, of an original 4 PA-4 Antenna set.

Further, the idea is not limited to support just one power amplifier as the only low energy configuration. FIG. 14 is a schematic diagram illustrating an example of a low power configuration using two power amplifiers and four antennas, a so-called 2 PA-4 Antenna configuration, of an original 4 PA-4 Antenna set. In this particular configuration example, a first power amplifier 10-1 is connected to two antennas 20-1, 20-2 via respective antenna branches that are configured with different delays by using delay element 30-1. A second power amplifier 10-2 is connected to two other antennas 20-3, 20-4 via respective antenna branches that are configured with different delays by using delay element 30-2.

Figure 15B:
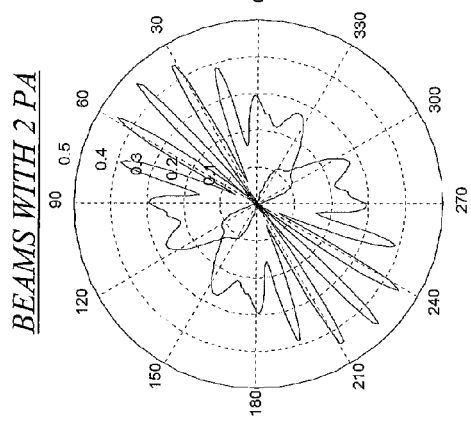
FIGS. 15A-B are schematic radiation pattern diagrams illustrating an example of the radiation patterns when four power amplifiers are used in FIG. 15A and the radiation patterns when two amplifiers are used without any mutual delays between the antenna branches in FIG. 15B.
Figure 15A:
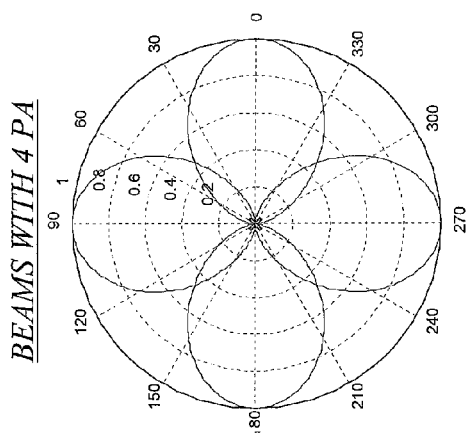

FIGS. 15A-B are schematic radiation pattern diagrams illustrating an example of the radiation patterns when four power amplifiers are used in FIG. 15A and the radiation patterns when two amplifiers are used without any mutual delays between the antenna branches in FIG. 15B.

Figure 16B:
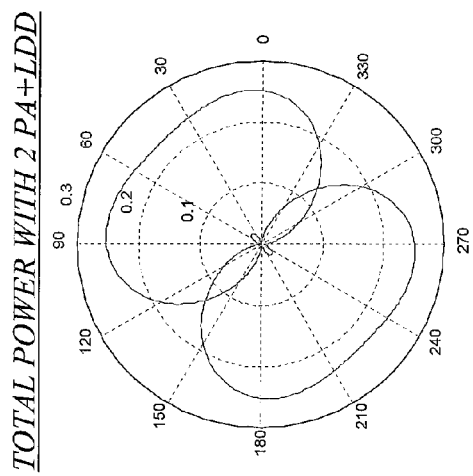
FIGS. 16A-B are schematic radiation pattern diagrams illustrating an example of the individual radiation patterns per sub-carrier in FIG. 16A and the total power over all sub-carriers in FIG. 16B when the antenna branches are configured with different delays according to the example of FIG. 14.
Figure 16A:
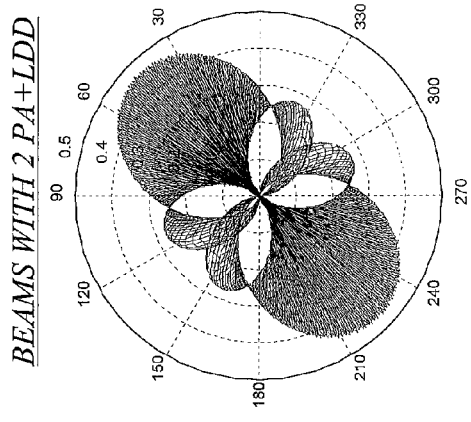

FIGS. 16A-B are schematic radiation pattern diagrams illustrating an example of the individual radiation patterns per sub-carrier in FIG. 16A and the total power over all sub-carriers in FIG. 16B when the antenna branches are configured with different delays according to the example of FIG. 14. In this example, the following configurations are used: $d/\lambda=3$, $v=1.85$, $t_1=t_2=1/BW$.

In addition, the antenna parameters have been tuned to make the radiation pattern a bit square-like, as can be seen from FIGS. 16A-B. This may be useful in some cities with a rectangular-like symmetry.

It should be understood that it is possible to employ not just two configurations that are used in dependence on traffic load, but to switch between several different configurations of the existing power amplifiers and antennas, e.g. 4 PA-4 Antenna, 2 PA-4 Antenna, and 1 PA-4 Antenna configurations.

In the following examples of FIGS. 17-19, the overall wireless communication system is typically a multi-carrier system operating based on sub-carriers of different frequencies. By way of example, the multi-carrier system is an Orthogonal Frequency Division Multiplexing (OFDM) or Orthogonal Frequency Division Multiple Access (OFDMA) system.

Figure 17:
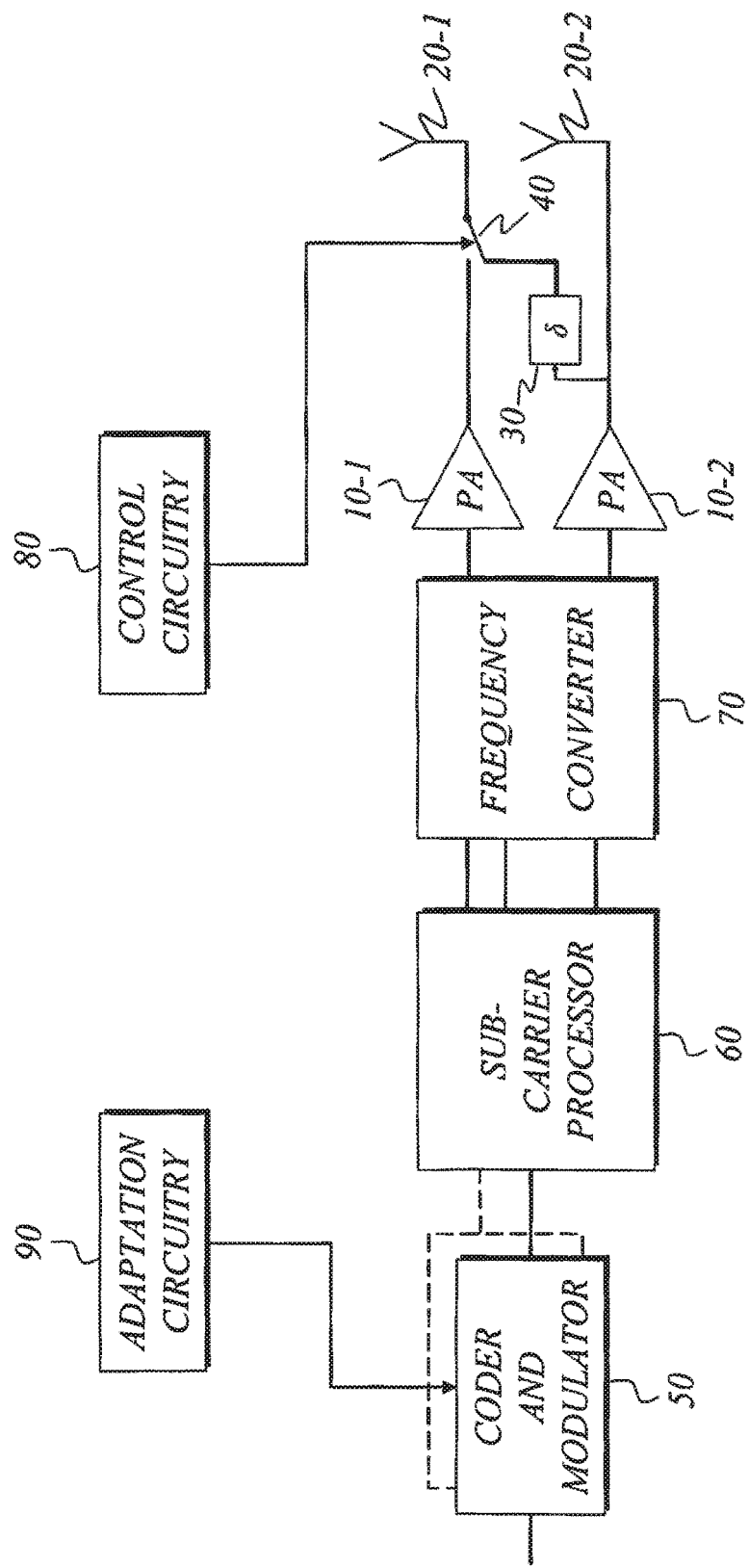
FIG. 17 is a schematic block diagram illustrating an example of a radio base station according to an embodiment.

FIG. 17 is a schematic block diagram illustrating an example of a radio base station designed for operation in a multi-carrier system. Basically, the radio base station 100 comprises a set of power amplifiers 10 and a set of antennas 20 with one or more delay elements 30 and associated switching circuitry 40, one or more (channel) coder and modulator units 50, a sub-carrier processor 60, a frequency converter 70, control circuitry 80 and adaptation circuitry 90.

The coder and modulator 50 is configured to receive input data and perform suitable channel coding and modulation, and the sub-carrier processor 60 is configured to perform standard sub-carrier processing for loading the coded and modulated data onto orthogonal sub-carriers in the frequency domain and converting the sub-carriers into time-domain signals, usually in the form of multi-carrier symbols such as OFDM symbols, for subsequent transmission. After digital-to-analog conversion (not shown) the analog multi-carrier symbols are sent to the frequency converter 70, which is configured perform frequency up-conversion to radio frequency.

In this example, the set of power amplifiers 10 and antennas 20 are arranged in two different configurations that can be alternately used by means of the switching circuitry 40. A first configuration includes the power amplifiers 10-1 and 10-2 together with the antennas 20-1 and 20-2. A second configuration includes the power amplifier 10-2 together with the antennas 20-1 and 20-2. In the second configuration, the antenna branches from the power amplifier 10-2 to the antennas 20-1 and 20-2 are configured with different delays, with a difference in delay between the antenna branches being represented by the delay element 30. The delay difference ($\delta$) preferably corresponds to the inverse bandwidth of the signals to be transmitted through the antennas.

It should be understood that there may be more than two power amplifiers and antennas. In general, the number of power amplifiers is an integer K and the number of antennas is an integer M, where K may be equal to M.

The control circuitry 80 is configured to control the switching operations of the switching circuitry 40, preferably based on time and/or traffic load.

In this particular example, the radio base station 100 further comprises adaptation circuitry 90 configured to adapt the modulation and coding of the coder and modulator 50 for substantially full bandwidth transmission of a multi-carrier symbol. This may for example be achieved by adapting the modulation and coding scheme, and hence the coding rate, in order to fill the entire multi-carrier symbol (e.g. an OFDM symbol) with data, when possible.

In the following, two different implementations for partial bandwidth transmission of a multi-carrier symbol will be described.

Figure 18:
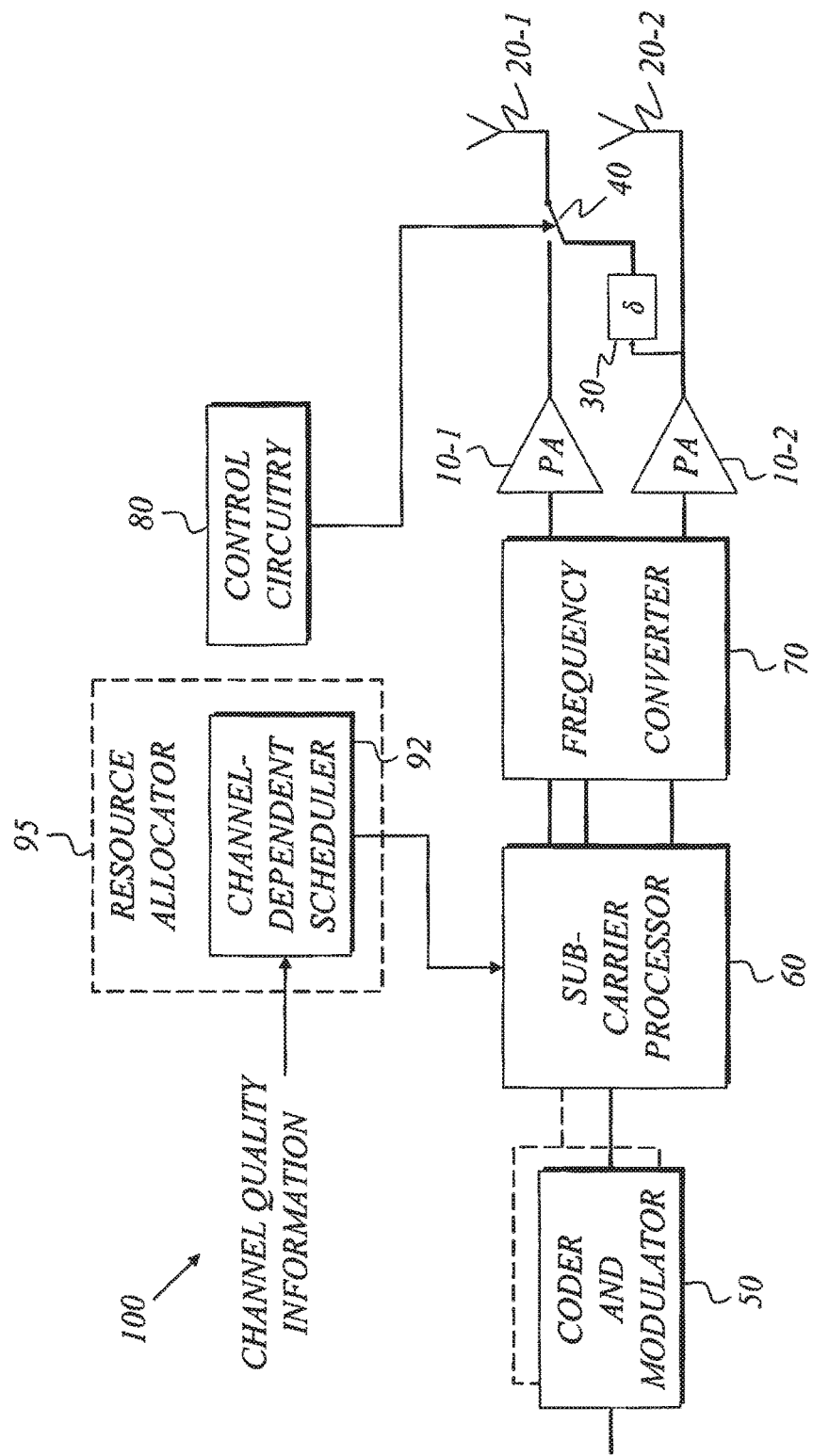
FIG. 18 is a schematic block diagram illustrating an example of a radio base station according to another embodiment.

FIG. 18 is a schematic block diagram illustrating an example of a radio base station according to another embodiment. The radio base station of FIG. 18 is similar to the base station of FIG. 17, except for the adaptation circuitry 90 of FIG. 17 which is not present in the base station of FIG. 18. The radio base station 100 of FIG. 18 further comprises a channel-dependent scheduler 92, which may be part of a general resource allocator 95. The channel-dependent scheduler 92 is configured to perform channel-dependent scheduling to select, for each user, a designated set of sub-carriers in dependence on frequency-dependent channel quality for partial bandwidth transmission of a multi-carrier symbol. The scheduler 92 thus receives channel quality information as input (from one or more users measuring the channel quality, e.g. on pilot signals), and operates in connection with the sub-carrier processor 60 to select appropriate sets of sub-carriers.

Figure 19:
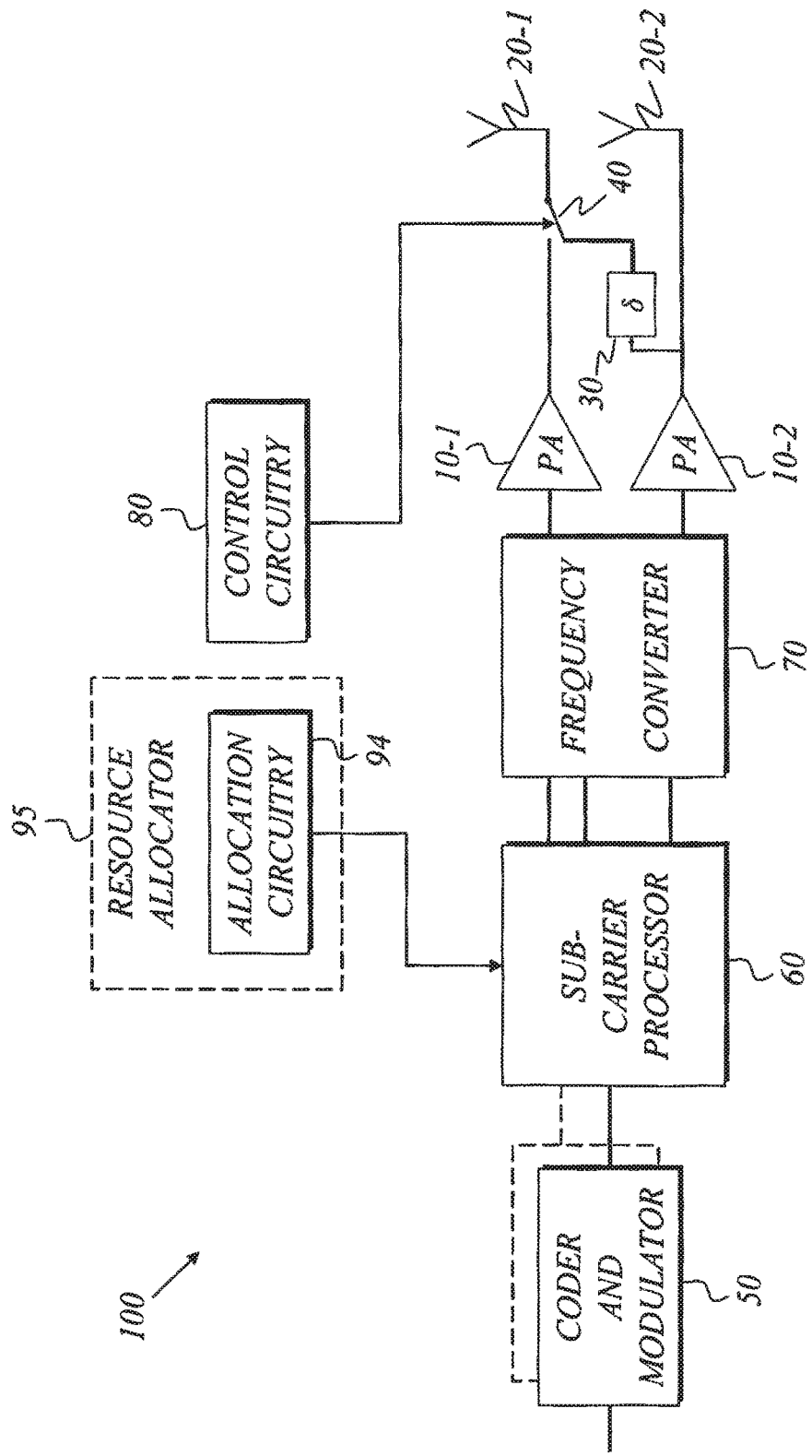
FIG. 19 is a schematic block diagram illustrating an example of a radio base station according to yet another embodiment.

FIG. 19 is a schematic block diagram illustrating an example of a radio base station according to yet another embodiment. The radio base station of FIG. 19 is similar to that of FIG. 18, but here the channel-dependent scheduler of FIG. 18 is replaced or complemented by allocation circuitry 94. The allocation circuitry 94 may form part of an overall resource allocator 95. Assuming that the power amplifier is connected to a number M of antennas via respective antenna branches that are configured with different delays, the allocation circuitry 94 is configured to allocate a designated sub-set of M sub-carriers for partial bandwidth transmission of a multi-carrier symbol. The M sub-carriers are successively separated from each other by N/M sub-carriers, where N is the total number of sub-carriers, as will be explained in detail below.

Functional blocks above may be implemented in hardware using any hardware technology such as Integrated Circuit (IC) technology. Alternatively, at least some functional blocks may be implemented in software for execution on suitable processing hardware such as a microprocessor or digital signal processor.

Figure 20:
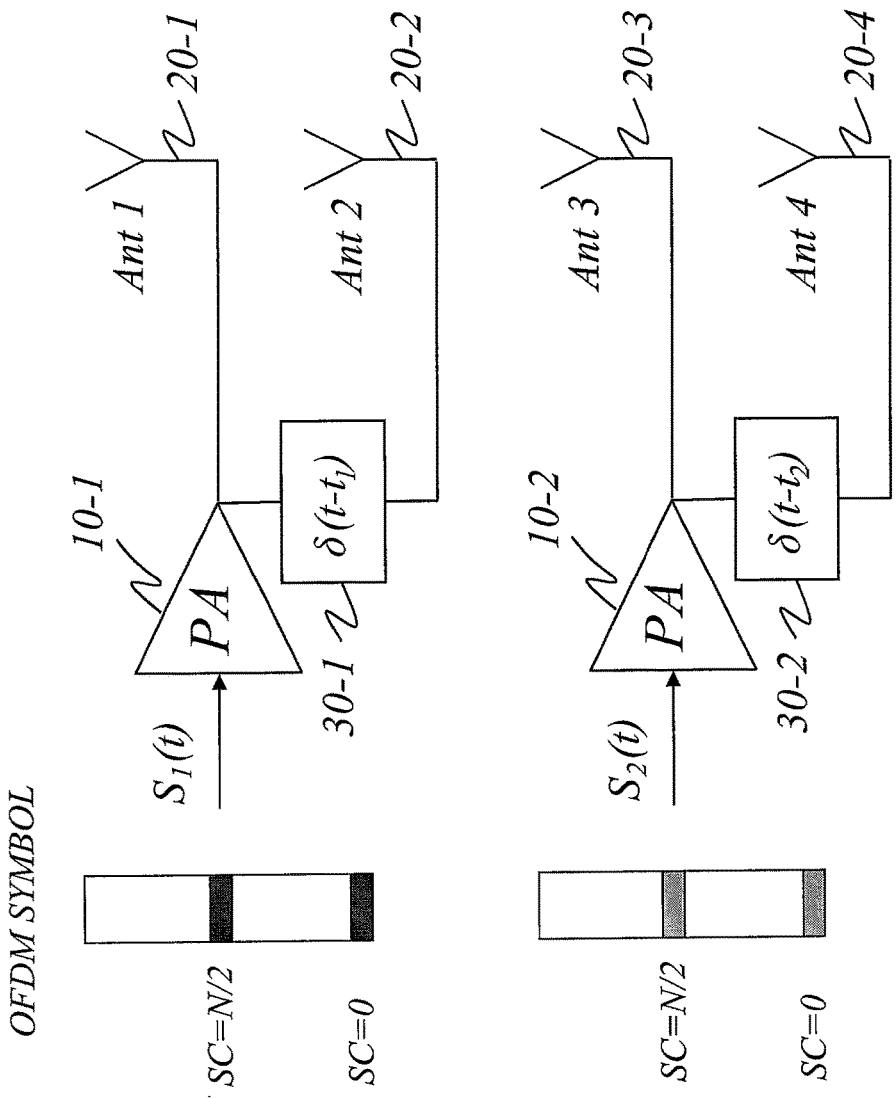
FIG. 20 is a schematic diagram illustrating an example of a low power configuration similar to that of FIG. 14, except that each modulated and coded signal is split into separated sub-carriers.

FIG. 20 is a schematic diagram illustrating an example of a low power configuration similar to that of FIG. 14. It is envisaged that the configuration employs two power amplifiers and four antennas, a so-called 2 PA-4 Antenna configuration, of an original 4 PA-4 Antenna set. In this example, each modulated and coded signal representing a multi-carrier symbol such as an OFDM symbol is split into two chunks separated N/2 sub-carriers apart. A designated sub-set of two separated sub-carriers is thus allocated for partial bandwidth transmission of signal $S_1(t)$ representing a multi-carrier symbol through antennas 20-1 and 20-2. Correspondingly, a designated sub-set of two separated sub-carriers is thus allocated for partial bandwidth transmission of signal $S_2(t)$ representing a multi-carrier symbol through antennas 20-3 and 20-4.

Figure 21A:
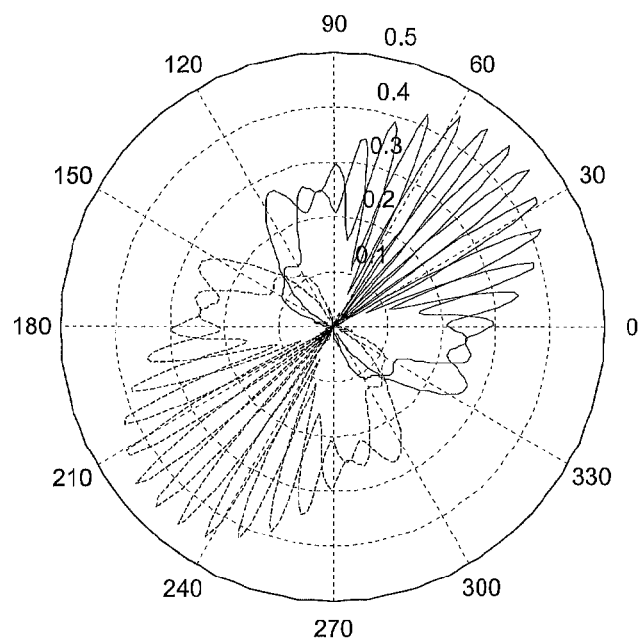
FIG. 21A illustrates an example of the individual radiation patterns per sub-carrier.
Figure 21B:
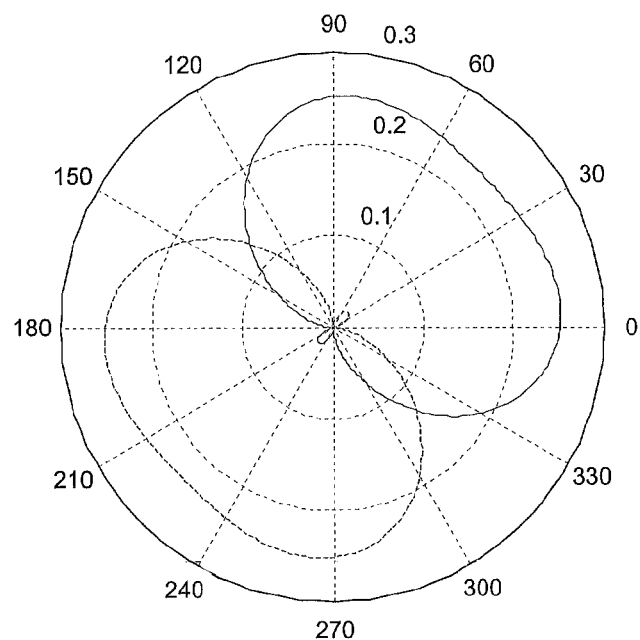
FIG. 21B illustrates the total power over all sub-carriers corresponding to the configuration of FIG. 20.

FIG. 21A illustrates an example of the individual radiation patterns per sub-carrier, and FIG. 21B illustrates the total power over all sub-carriers corresponding to the configuration of FIG. 20. In this example, the following configurations are used: $d/\lambda=3$, $v=1.85$, $t_1=t_2=1/BW$.

Figure 22:
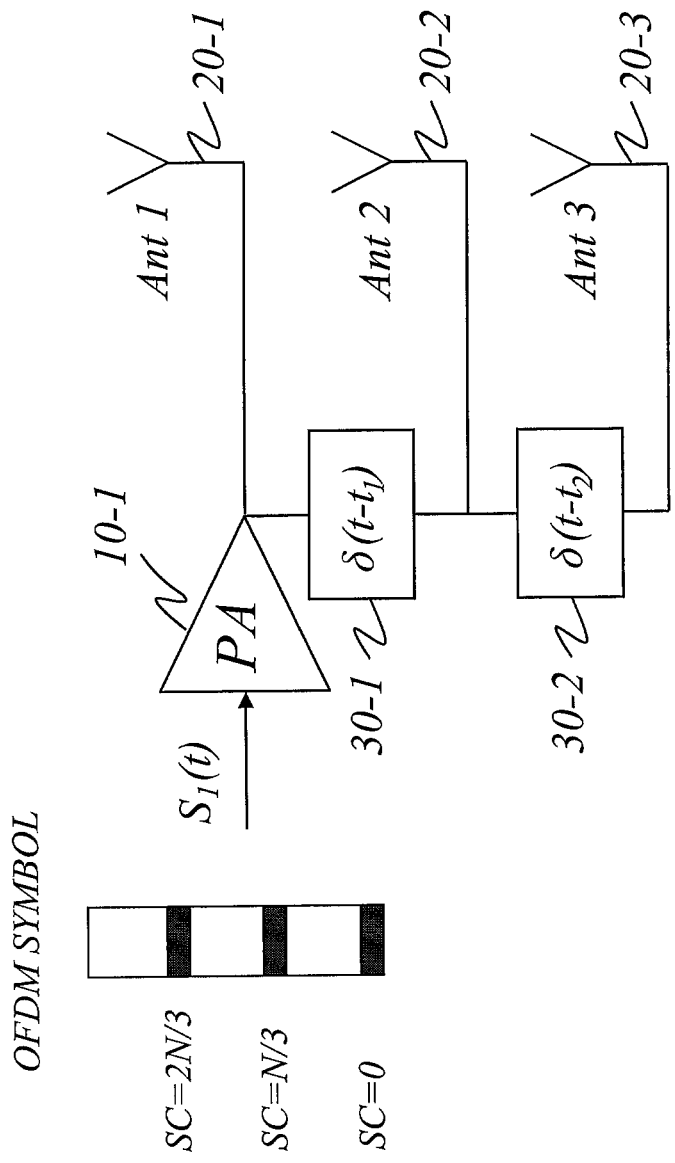
FIG. 22 is a schematic diagram illustrating an example of a low power configuration similar to that of FIG. 8, except that the modulated and coded signal is split into separated sub-carriers.

FIG. 22 is a schematic diagram illustrating an example of a low power configuration similar to that of FIG. 8, except that the modulated and coded signal is split into separated sub-carriers. It is envisaged that the configuration employs a power amplifier and three antennas, a so-called 1 PA-3 Antenna configuration, of an original 3 PA-3 Antenna set. In this example, a modulated and coded signal $S_1(t)$ representing a multi-carrier symbol such as an OFDM symbol is split into three chunks successively separated N/3 sub-carriers apart. Accordingly, a designated sub-set of three separated sub-carriers is allocated for partial bandwidth transmission of signal $S_1(t)$ representing a multi-carrier symbol through antennas 20-1, 20-2 and 20-3.

Figure 23A:
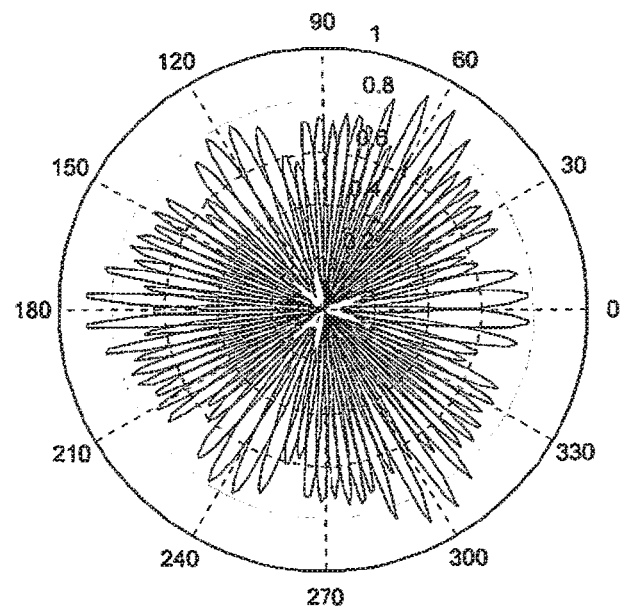
FIG. 23A illustrates an example of the individual radiation patterns per sub-carrier.
Figure 23B:
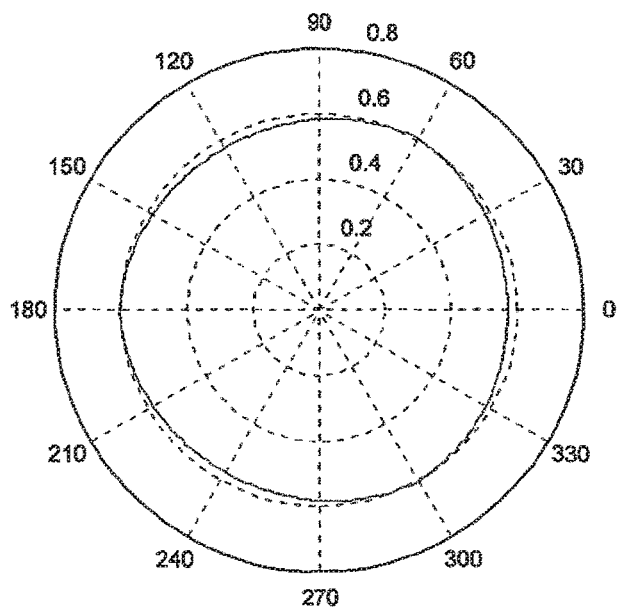
FIG. 23B illustrates the total power over all sub-carriers corresponding to the configuration of FIG. 22.

FIG. 23A illustrates an example of the individual radiation patterns per sub-carrier, and FIG. 23B illustrates the total power over all sub-carriers corresponding to the configuration of FIG. 22. In this example, the following configurations are used: $d/\lambda=3$, $v=1.85$, $t_1=t_2=1/BW$.

The invention may also be used to support transmission schemes exploiting multiple polarizations. In this case, the minimum configuration uses two power amplifiers, each connected to a set of antennas of the same polarization. Apparently, the different sets of antennas have different polarizations. In this way, one may concurrently use two polarizations for each direction/sector.

Figure 24:
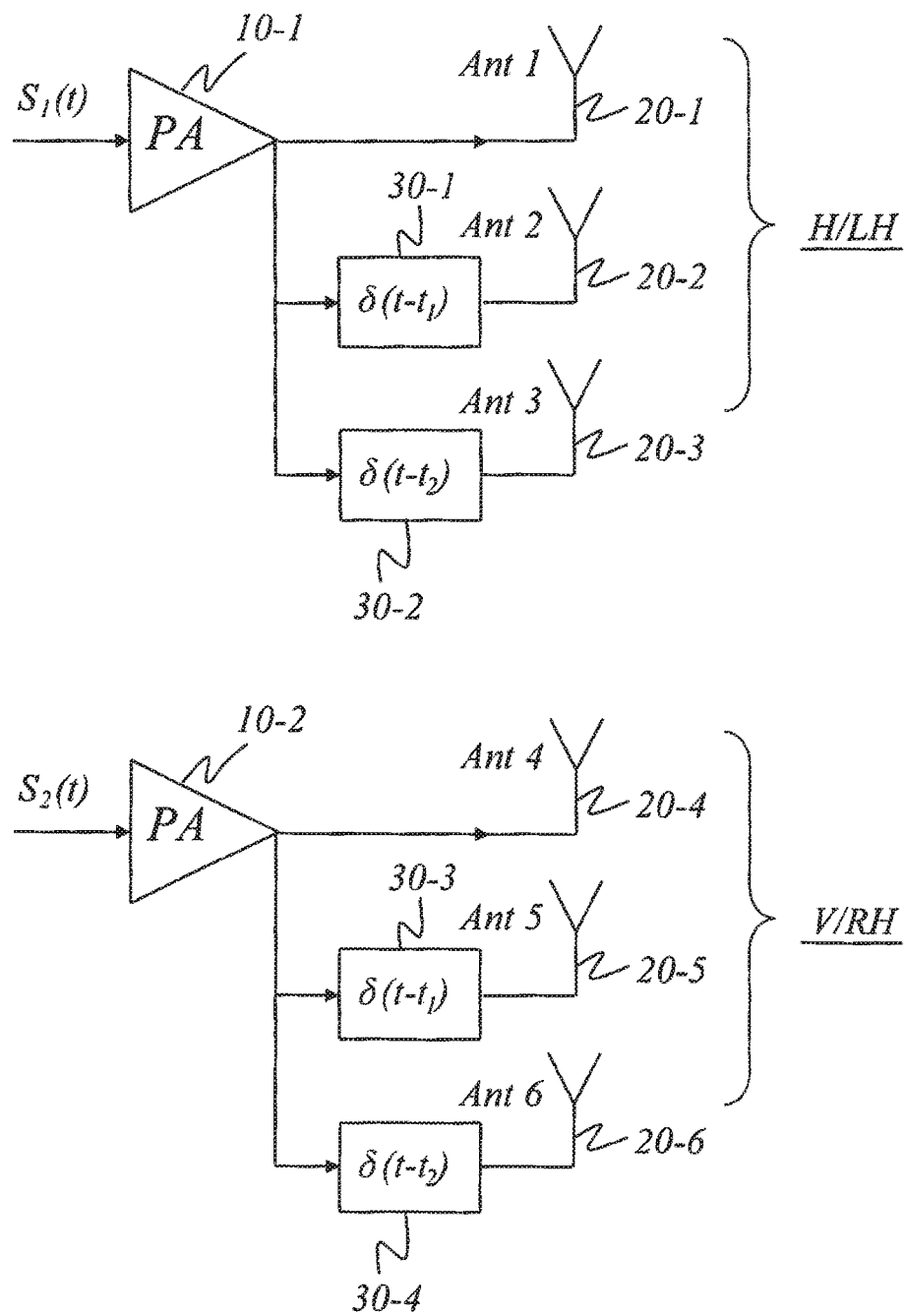
FIG. 24 is a schematic diagram illustrating an example of a power amplifier-antenna arrangement that supports the use of multiple polarizations.

FIG. 24 is a schematic diagram illustrating an example of a power amplifier-antenna arrangement that supports the use of multiple polarizations. In this example, a first power amplifier 10-1 is connected to the antennas 20-1, 20-2, 20-3 via respective antenna branches that are configured with different delays, as represented by the delay elements 30-1 and 30-2. The antennas 20-1, 20-2, 20-3 have a first polarization, e.g. horizontal (H) linear polarization or left hand (LH) circular polarization. A second power amplifier 10-2 is connected to the antennas 20-4, 20-5, 20-6 via respective antenna branches that are configured with different delays, as represented by the delay elements 30-3 and 30-4. The antennas 20-4, 20-5, 20-6 have a second polarization, e.g. vertical (V) linear polarization or right hand (RH) circular polarization, orthogonal to the first respective polarization. In this way, two different signals $S_1(t)$ and $S_2(t)$ may be concurrently transmitted even though the antenna set 20-1, 20-2, 20-3 on one hand and the antenna set 20-4, 20-5, 20-6 on the other hand have substantially the same directional coverage.

Figure 25:
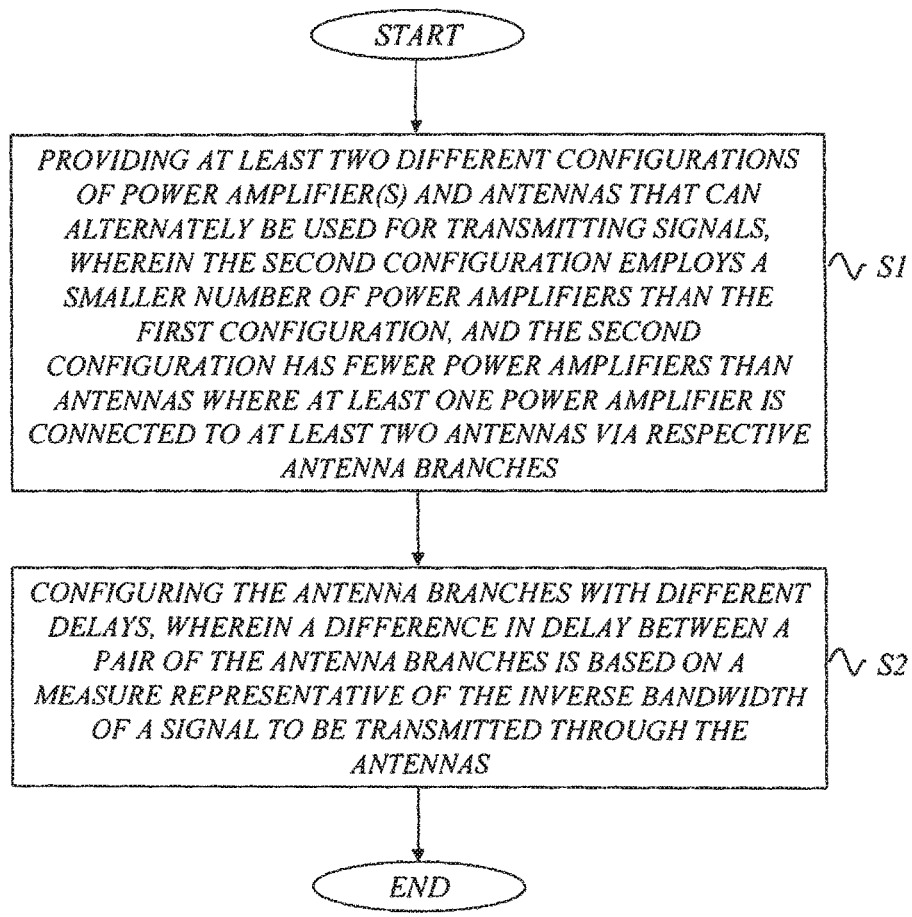
FIG. 25 is a schematic flow diagram illustrating method for configuring an arrangement having a set of power amplifiers and a set of antennas.

FIG. 25 is a schematic flow diagram illustrating method for configuring an arrangement having a set of power amplifiers and a set of antennas. In step S1, the method involves providing at least two different configurations of power amplifier(s) and antennas that can alternately be used for transmitting signals, including a first configuration of power amplifiers and antennas and a second configuration of power amplifier(s) and antennas. The second configuration employs a smaller number of power amplifiers than the first configuration, and the second configuration has fewer power amplifiers than antennas where at least one power amplifier is connected to at least two antennas via respective antenna branches. In step S2, the method involves configuring the antenna branches with different delays, wherein a difference in delay between a pair of antenna branches is based on a measure representative of the inverse bandwidth of a signal to be transmitted through the antennas.

With such a configuration, reduced power consumption can be combined with adequate directional radio coverage.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] U.S. Pat. No. 6,091,970
[2] U.S. Pat. No. 6,577,879
[3] WO 2009/152859
[4] J. H. Winters, "*The diversity gain of transmit diversity in wireless systems with Rayleigh fading*", IEEE Trans. Vehicular Technology, vol. 47, no. 1, pp. 119-123, February 1998.
[5] U.S. Pat. No. 6,842,487
[6] S. Kaiser, "Spatial transmit diversity techniques for broadband OFDM systems" GLOBECOM 2000, November 2000.

The invention claimed is:

1. An arrangement for a wireless communication system, comprising:
  a set of power amplifiers and a set of antennas;
  the set of power amplifiers and the set of antennas jointly having at least two different configurations, including a first configuration and a second configuration;
  switching circuitry configured to switch between the configurations;
  wherein the second configuration employs a smaller number of power amplifiers than the first configuration;
  wherein the second configuration has fewer power amplifiers than antennas, with at least one power amplifier connected to at least two antennas via respective antenna branches that are configured with different delays; wherein a difference in delay between a pair of the antenna branches is based on a measure representative of the inverse bandwidth of a signal to be transmitted through the antennas.

2. The arrangement of claim 1 wherein differences in delay between different pairs of the antenna branches correspond to different non-zero integer multiples of the inverse bandwidth.

3. The arrangement of claim 2:
  wherein the at least one power amplifier is connected to a number N of antennas via respective antenna branches that are configured with different delays;
  wherein a difference in delay between antenna branch of antenna n and antenna branch of antenna n+1 corresponds to the inverse bandwidth, where n=1, . . . , N-1.

4. The arrangement of claim 1 wherein a difference in delay between a pair of the antenna branches is equal to the inverse bandwidth with a 25% margin of precision.

5. The arrangement of claim 1 wherein a difference in delay between a pair of the antenna branches is equal to the inverse bandwidth with a 10% margin of precision.

6. The arrangement of claim 1 wherein a difference in delay between a pair of the antenna branches is equal to the inverse bandwidth with a 5% margin of precision.

7. The arrangement of claim 1:
wherein the antennas are directional antennas, with each directional antenna arranged to have a radiation pattern;
wherein each radiation pattern covers a respective angular sector such that a combined radiation pattern of all antennas provides wider radio coverage than the radiation pattern of an individual antenna.

8. The arrangement of claim 7 wherein the delays of the antenna branches in the second configuration are adapted to maintain a max-to-min ratio of radiated power of the combined radiation pattern below a predetermined level.

9. The arrangement of claim 8 wherein the delays are adapted to maintain the max-to-min ratio of radiated power of the combined radiation pattern below 10 dB.

10. The arrangement of claim 8 wherein the delays are adapted to maintain the max-to-min ratio of radiated power of the combined radiation pattern below 6 dB.

11. The arrangement of claim 8 wherein the delays are adapted to maintain the max-to-min ratio of radiated power of the combined radiation pattern below 3 dB.

12. The arrangement of claim 1 wherein the arrangement further comprises control circuitry configured to control the switching operations of the switching circuitry based on time or traffic load.

13. The arrangement of claim 1:
wherein the wireless communication system is a multi-carrier system operating based on sub-carriers of different frequencies;
wherein the arrangement further comprises adaptation circuitry configured to adapt modulation and coding for substantially full bandwidth transmission of a multi-carrier symbol.

14. The arrangement of claim 13 wherein the multi-carrier system is an Orthogonal Frequency Division Multiplexing system or an Orthogonal Frequency Division Multiple Access system.

15. The arrangement of claim 1:
wherein the wireless communication system is a multi-carrier system operating based on sub-carriers of different frequencies;
wherein the arrangement further comprises a channel-dependent scheduler configured to perform channel-dependent scheduling to select, for each user, a designated set of sub-carriers in dependence on frequency-dependent channel quality for partial bandwidth transmission of a multi-carrier symbol.

16. The arrangement of claim 1:
wherein the wireless communication system is a multi-carrier system operating based on sub-carriers of different frequencies;
wherein the at least one power amplifier is connected to a number M of antennas via respective antenna branches that are configured with different delays;
wherein the arrangement further comprises allocation circuitry configured to allocate a designated sub-set of M sub-carriers for partial bandwidth transmission of a multi-carrier symbol;
wherein the M sub-carriers are successively separated from each other by N/M sub-carriers, where N is the total number of sub-carriers.

17. The arrangement of claim 1 wherein the arrangement comprises a portion of a radio base station.

18. A method for configuring an arrangement having a set of power amplifiers and a set of antennas, the method comprising:
providing at least two different configurations of the power amplifiers and the antennas that can alternately be used for transmitting signals, including a first configuration and a second configuration;
wherein the second configuration employs a smaller number of power amplifiers than the first configuration;
wherein the second configuration has fewer power amplifiers than antennas with at least one power amplifier connected to at least two antennas via respective antenna branches;
configuring the antenna branches with different delays, wherein a difference in delay between a pair of the antenna branches is based on a measure representative of the inverse bandwidth of a signal to be transmitted through the antennas.

19. The arrangement of claim 1 wherein the first configuration has at least as many amplifiers as antennas.

* * * * *